(12) United States Patent
Nakano et al.

(10) Patent No.: US 12,744,475 B2
(45) Date of Patent: Sep. 22, 2026

(54) ELECTROSTATIC TRANSDUCER

(71) Applicant: Sumitomo Riko Company Limited, Aichi (JP)

(72) Inventors: Katsuhiko Nakano, Aichi (JP); Shinya Tahara, Aichi (JP); Masaki Nasu, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 263 days.

(21) Appl. No.: 18/608,906

(22) Filed: Mar. 18, 2024

(65) Prior Publication Data

US 2024/0223107 A1 Jul. 4, 2024

Related U.S. Application Data

(63) Continuation of application No. PCT/JP2023/002289, filed on Jan. 25, 2023.

(30) Foreign Application Priority Data

Jan. 27, 2022 (JP) ................................ 2022-011227

(51) Int. Cl.
*H02N 1/00* (2006.01)

(52) U.S. Cl.
CPC .................................. *H02N 1/002* (2013.01)

(58) Field of Classification Search
CPC .. H02N 1/002; H04R 31/00; B29C 66/73921; B06B 1/0292
See application file for complete search history.

(56) References Cited

U.S. PATENT DOCUMENTS

2019/0216304 A1 7/2019 Kimura
2020/0213772 A1* 7/2020 Hasegawa ................ H04R 1/06
2023/0275529 A1 8/2023 Tahara et al.

FOREIGN PATENT DOCUMENTS

JP 2009021549 1/2009
JP 4844848 12/2011
JP 2017183814 A * 10/2017
JP 6464321 2/2019
(Continued)

OTHER PUBLICATIONS

18608906_2026-01-29_JP_2017183814_A_H.pdf (Year: 2026).*
(Continued)

*Primary Examiner* — Christopher M Koehler
*Assistant Examiner* — Ahmed F Seck
(74) *Attorney, Agent, or Firm* — JCIPRNET

(57) ABSTRACT

An electrostatic transducer (1) includes: a first electrical joint part (81) for electrically joining a first electrode sheet (20) and a first core wire (40*a*); a first insulation joint part (82) for joining an insulator sheet (10) and a first covering material (40*b*); a second electrical joint part (91) for electrically joining a second electrode sheet (30) and a second core wire (50*a*) of a second lead wire (50); and a second insulation joint part (92) for joining the insulator sheet (10) and a second covering material (50*b*) of the second lead wire (50). The first and second electrical joint parts are disposed spaced apart from one another in a surface direction of the insulator sheet (10), and the first insulation joint part (82) and the second insulation joint part (92) are disposed spaced apart from one another in the surface direction of the insulator sheet (10).

9 Claims, 4 Drawing Sheets

(56) References Cited

FOREIGN PATENT DOCUMENTS

| | | |
|---|---|---|
| JP | 6511271 | 5/2019 |
| JP | 6511271 B2 * | 5/2019 |
| WO | 2022113395 | 6/2022 |

OTHER PUBLICATIONS

18608906_2026-01-29_JP_6511271_B2_H.pdf (Year: 2026).*
"Search Report of Europe Counterpart Application", issued on Nov. 15, 2024, p. 1-p. 8.
"Invitation pursuant to Rule 137(4) EPC and Article 94(3) EPC of Europe Counterpart Application No. 23746984.6", issued on Aug. 14, 2025, p. 1-p. 3.
"International Search Report (Form PCT/ISA/210) of PCT/JP2023/002289", mailed on Feb. 28, 2023, with English translation thereof, pp. 1-4.

* cited by examiner

ELECTROSTATIC TRANSDUCER

CROSS-REFERENCE TO RELATED APPLICATION

This application is a continuation of PCT International Application No. PCT/JP2023/002289, filed on Jan. 25, 2023, which claims priority under 35 U.S.C § 119(a) to Japanese Patent Application No. 2022-011227, filed on Jan. 27, 2022. Each of the above application(s) is hereby expressly incorporated by reference, in its entirety, into the present application.

BACKGROUND

Technical Field

The disclosure relates to an electrostatic transducer.

Description of Related Art

Patent Document 1 discloses to expose a core wire of a lead wire (same as conductive wire), connect the core wire with an electrode pad on a substrate through ultrasonic welding, and fix the lead wire to the substrate through a fixing resin. Patent Document 2 discloses to connect an exposed core wire to a connection land via a metal tube through ultrasonic welding.

Patent Document 3 discloses to join a core wire of a lead wire with a terminal electrode through ultrasonic welding without peeling off an insulation cover of an end of the lead wire. In Patent Document 4, spiral flat coils are formed on a surface of a thermoplastic film. In the flat coils, the flat coils are formed to be spiral in substantially the same direction and in substantially the same shape by welding lead wires covered by a thermoplastic resin onto a film surface.

PRIOR ART DOCUMENT(S)

Patent Document(s)

Patent Document 1: Japanese Patent No. 6511271

Patent Document 2: Japanese Patent No. 6464321

Patent Document 3: Japanese Patent No. 4844848

Patent Document 4: Japanese Laid-open No. 2009-21549

In a state in which the tip end of a lead wire is attached to an electrode sheet, from the viewpoint of the connection state reliability, it is important to prevent the lead wire from being pulled out or peeled off from the electrode sheet in the axial direction of the lead wire. In particular, if the electrode sheet is soft, the lead wire may be easily pulled out or peeled off. Moreover, it is desired that the electrode sheet and the lead wire be connected easily at a low cost.

The disclosure provides an electrostatic transducer capable of reliably electrically joining a core wire of a lead wire with an electrode sheet and increasing a pull-out strength of the lead wire.

SUMMARY

An aspect of the disclosure provides an electrostatic transducer. The electrostatic transducer includes: an insulator sheet; a first electrode sheet, disposed on a first surface of the insulator sheet; a second electrode sheet, disposed on a second surface of the insulator sheet; a first lead wire, including: a first core wire; and a first cover material, covering the first core wire and containing a thermoplastic material, wherein the first lead wire has a portion disposed to be overlapped with the first surface of the insulator sheet and a portion disposed to be overlapped with the first electrode sheet; a second lead wire, including: a second core wire; and a second cover material, covering the second core wire and containing a thermoplastic material, wherein the second lead wire has a portion disposed to be overlapped with the second surface of the insulator sheet and a portion disposed to be overlapped with the second electrode sheet; a first electrical joint part, electrically joining the first electrode sheet and the first core wire of the first lead wire in a first electrical joint region which is a region in a surface direction of the insulator sheet and in which the first electrode sheet and the first core wire of the first lead wire are disposed to be overlapped; a first insulation joint part, joining the insulator sheet and the first cover material of the first lead wire in a first insulation joint region which is a region different from the first electrical joint region in the surface direction of the insulator sheet and in which the insulator sheet and the first cover material of the first lead wire are disposed to be overlapped; a second electrical joint part, electrically joining the second electrode sheet and the second core wire of the second lead wire in a second electrical joint region which is a region in the surface direction of the insulator sheet and in which the second electrode sheet and the second core wire of the second lead wire are disposed to be overlapped; and a second insulation joint part, joining the insulator sheet and the second cover material of the second lead wire in a second insulation joint region which is a region different from the second electrical joint region in the surface direction of the insulator sheet and in which the insulator sheet and the second cover material of the second lead wire are disposed to be overlapped. The first electrical joint part and the second electrical joint part are disposed to be spaced apart in the surface direction of the insulator sheet. The first insulation joint part and the second insulation joint part are disposed to be spaced apart in the surface direction of the insulator sheet.

DESCRIPTION OF THE EMBODIMENTS

Figure 1:
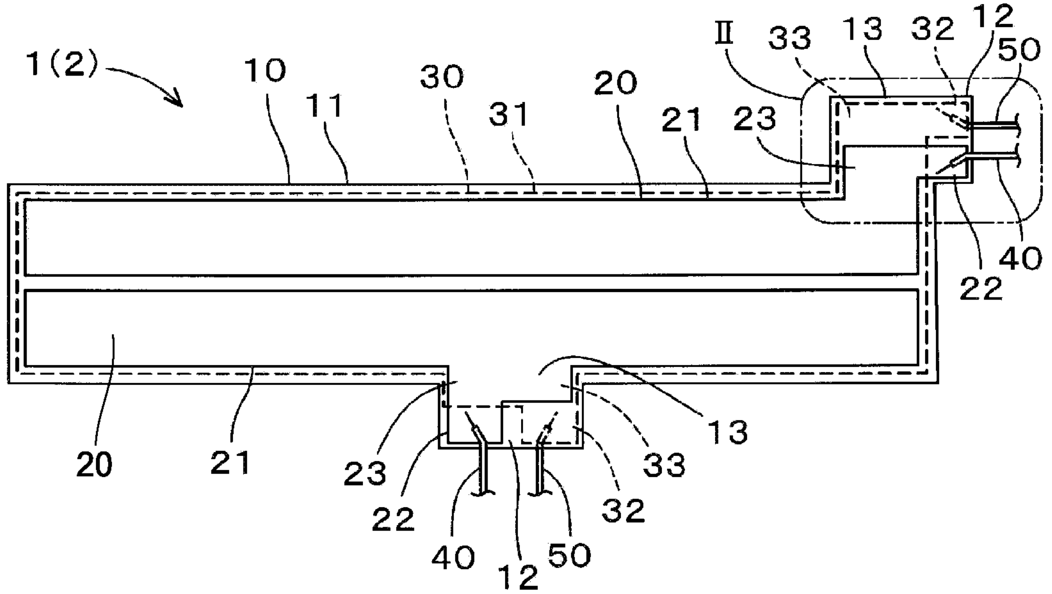
FIG. 1 is a plan view illustrating an electrostatic transducer according to Embodiment 1.

An aspect of the disclosure provides an electrostatic transducer. The electrostatic transducer includes: an insulator sheet; a first electrode sheet, disposed on a first surface of the insulator sheet; a second electrode sheet, disposed on a second surface of the insulator sheet; a first lead wire, including: a first core wire; and a first cover material, covering the first core wire and containing a thermoplastic material, wherein the first lead wire has a portion disposed to be overlapped with the first surface of the insulator sheet and a portion disposed to be overlapped with the first electrode sheet; a second lead wire, including: a second core wire; and a second cover material, covering the second core wire and containing a thermoplastic material, wherein the second lead wire has a portion disposed to be overlapped with the second surface of the insulator sheet and a portion disposed to be overlapped with the second electrode sheet; a first electrical joint part, electrically joining the first electrode sheet and the first core wire of the first lead wire in a first electrical joint region which is a region in a surface direction of the insulator sheet and in which the first electrode sheet and the first core wire of the first lead wire are disposed to be overlapped; a first insulation joint part, joining the insulator sheet and the first cover material of the first lead wire in a first insulation joint region which is a region different from the first electrical joint region in the surface direction of the insulator sheet and in which the insulator sheet and the first cover material of the first lead wire are disposed to be overlapped; a second electrical joint part, electrically joining the second electrode sheet and the second core wire of the second lead wire in a second electrical joint region which is a region in the surface direction of the insulator sheet and in which the second electrode sheet and the second core wire of the second lead wire are disposed to be overlapped; and a second insulation joint part, joining the insulator sheet and the second cover material of the second lead wire in a second insulation joint region which is a region different from the second electrical joint region in the surface direction of the insulator sheet and in which the insulator sheet and the second cover material of the second lead wire are disposed to be overlapped. The first electrical joint part and the second electrical joint part are disposed to be spaced apart in the surface direction of the insulator sheet. The first insulation joint part and the second insulation joint part are disposed to be spaced apart in the surface direction of the insulator sheet.

According to the aspect, the first electrical joint part in the first electrical joint region electrically joins the first electrode sheet and the first core wire of the first lead wire are electrically joined. Meanwhile, the first insulation joint part in the first insulation joint region joins the insulator sheet and the first cover material of the first lead wire. That is, regarding the pull-out strength of the first lead wire, the second insulation joint part in the first insulation joint region mainly functions. In this way, electrical joining and pull-out strength can both be achieved by making the portion where the first electrode sheet and the first core wire of the first lead wire are electrically joined and the portion where the pull-out strength of the first lead wire is secured separate portions. Accordingly, the first core wire of the first lead wire and the first electrode sheet can be reliably joined electrically, and the pull-out strength of the first lead wire can be increased.

The same applies to the joining the second electrode sheet and the second lead wire. Accordingly, the second core wire of the second lead wire and the second electrode sheet can be reliably joined electrically, and the pull-out strength of the second lead wire can be increased.

In addition, the first electrical joint part and the second electrical joint part are disposed to be spaced apart in the surface direction of the insulator sheet, and the first insulation joint part and the second insulation joint part are disposed to be spaced apart from one another in the surface direction of the insulator sheet. Accordingly, the joining process for the first electrical joint part and the second electrical joint part becomes easy, and the joining process for the first insulation joint part and the second insulation joint part becomes easy. Moreover, the thickness of the insulator sheet can be reduced.

According to the aspect described above, the electrostatic transducer as follows can be provided: the first core wire of the first lead wire can be reliably electrically jointed to the first electrode sheet, and the pull-out strength of the first lead wire can be increased, and the second core wire of the second lead wire can be reliably electrically jointed to the second electrode sheet, and the pull-out strength of the second lead wire can be increased.

It is noted that the reference numerals in parentheses in the claims indicate correspondence with specific means described in the embodiments described later, and shall not be construed as limiting the technical scope of the disclosure.

Embodiment 1

1. Application Target

An electrostatic transducer includes a base material and an electrostatic sheet attached to an attachment surface of the base material. The base material may be any component, and may be formed by materials such as metal, resin, or other materials.

The attachment surface of the base material may be formed in a three-dimensional shape, such as a curved surface, a composite flat surface (a shape formed by multiple flat surfaces) or a composite shape of a flat surface and a curved surface, and may also be formed in a single flat surface shape. In the case where the base material is formed by a flexible material, the electrostatic sheet can be attached to the attachment surface of the base material. Moreover, it may also be configured that the electrostatic transducer is formed by the electrostatic sheet alone without being provided with the base material.

The electrostatic sheet is disposed on the attachment surface (surface) of the base material. The entire electrostatic sheet is soft. That is, the electrostatic sheet is flexible and configured to be stretchable in a surface direction. Accordingly, even if the attachment surface of the base material is in a three-dimensional shape, the electrostatic sheet can be attached along the attachment surface of the base material. In particular, by stretching the electrostatic sheet in the surface direction while attaching the electrostatic sheet to the attachment surface of the base material, wrinkles can be prevented from occurring on the electrostatic sheet.

The electrostatic sheet is configured to function as an actuator or a sensor by using the electrostatic capacity variation between a pair of target electrodes. It is sufficient if the electrostatic sheet includes at least one of the pair of target electrodes, and is not limited to the configuration that includes the pair of target electrodes. In addition, the electrostatic sheet may be configured to include a shield electrode. That is, the electrostatic sheet is of a first type that includes a pair of target electrodes, a second type that includes a pair of target electrodes and a shield electrode, and a third type that includes one of the pair of target electrodes and a shield electrode. In the third type, the other target electrode may also be an external conductor.

The electrostatic sheet can be configured as an actuator that generates vibrations, sounds, etc., by using the electrostatic capacity variation between the pair of target electrodes. In addition, the electrostatic sheet, for example, can be configured as a sensor that detects an external pressing force, etc., a sensor that detects a contact or approaching of a conductive body having a potential, by using the electrostatic capacity variation between the target electrodes.

In the case where the electrostatic sheet is configured as an actuator, by applying a voltage to the target electrodes, an insulation body is deformed in accordance with the potential between the target electrodes, and vibrations occur together with the deformation of the insulation body. In the case where the electrostatic sheet is configured as a sensor that detects a pressing force, the electrostatic capacity between the target electrodes varies due to the deformation of the insulation body resulting from the input of an external pressing force, vibrations, and sounds (referred to as "external pressing force, etc."), and the external pressing force, etc., is detected by detecting a voltage in accordance with the electrostatic capacity between the target electrodes.

In the case where the electrostatic sheet is configured as a sensor detecting contacts or approaching, the electrostatic capacity between the target electrodes varies through contacts or approaching of a conductive body having a potential, and the contacts or the approaching of the conductive body is detected by detecting a voltage in accordance with the varied electrostatic capacity between the target electrodes.

The electrostatic transducer, for example, can be applied to a surface of a pointing device, such as a mouse or a joystick, a surface of a vehicle component, etc. Examples of the vehicle components include an armrest, a doorknob, a shift lever, a steering wheel, a door trim, a center trim, a center console, a ceiling, etc. In several cases, the base material may be formed by a material that is not flexible, such as metal or a hard resin. Besides, the electrostatic transducer is configured to detect the state of a target person or apply vibrations, etc., to the target person.

Moreover, in order to detect the state of a seated person of a seat, the electrostatic transducer may also be disposed on a seat surface or a seat back surface. In such case, the electrostatic transducer may be configured by providing a single electrostatic sheet to a seat, and may also be configured by attaching the electrostatic sheet to any base material.

In addition, the electrostatic transducer can also be configured to offer a heater function. In such case, the electrostatic transducer can apply heat to the target person, in addition to detecting the state of the target person or applying vibrations to the target person.

2. Overall Configuration of Electrostatic Transducer 1

The overall configuration of an electrostatic transducer 1 of Embodiment 1 is described with reference to FIG. 1. The electrostatic transducer 1 at least includes an electrostatic sheet 2. The electrostatic sheet 2 may be provided on the surface of a base material not shown herein, and may also be used alone.

In FIG. 1, the electrostatic sheet 2 is formed in an elongated planar shape. However, the electrostatic sheet 2 is flexible and can be formed in any shape by making the electrostatic sheet 2 able to stretch and contract. That is, the electrostatic sheet 2 shown in FIG. 1 shows an initial shape before deformation.

The electrostatic sheet 2 at least includes an insulator sheet 10, a first electrode sheet 20, a second electrode sheet 30, a first lead wire 40, and a second lead wire 50. In the embodiment, the following case is described as an example: the electrostatic sheet 2 includes multiple (e.g., two) first electrode sheets 20 and one second electrode sheet 30, and further includes multiple (e.g., two) first lead wires 40 and multiple (e.g., two) second lead wires 50.

The insulator sheet 10 is formed by including an elastomer as the main component, for example. Accordingly, the insulator sheet 10 is soft. That is, the insulator sheet 10 is soft and is configured to be stretchable in a surface direction. The insulator sheet 10 is formed by, for example, including a thermoplastic material, particularly a thermoplastic elastomer, as a main component. The insulator sheet 10 may be formed by the thermoplastic elastomer itself, and may also be formed mainly of an elastomer crosslinked by heating the thermoplastic elastomer material.

In addition, the insulator sheet 10 may also include rubber, resin, or other materials, etc., other than the thermoplastic elastomer. For example, in the case where the insulator sheet 10 contains rubber, such as ethylene-propylene rubber (EPM, EPDM), the softness of the insulator sheet 10 increases. From the perspective of increasing the softness of the insulator sheet 10, the insulator sheet 10 may also contain a component that imparts softness, such as a plasticizer.

The insulator sheet 10 includes an insulation body part 11, multiple (e.g., two) insulation terminal parts 12, and multiple (e.g., two) insulation intermediate parts 13. The insulation body part 11 is formed in a planar shape, and forms a region that functions as an actuator or a sensor. The respective insulation terminal parts 12 form regions joined to the first lead wire 40 and the second lead wire 50. The insulation terminal parts 12 are indirectly connected with the insulation body part 11, and are formed toward an outer side in the surface direction from side edges the insulation body part 11. The respective insulation intermediate parts 13 form regions connecting the insulation body part 11 and the insulation terminal parts 12. The insulation intermediate part 131 is interposed between the insulation body part 11 and the insulation terminal parts 12 in the surface direction of the insulator sheet 10. The insulation terminal parts 12 may also be directly connected with the insulation body part 11. In this case, the insulation intermediate parts 13 are omitted.

One insulation terminal part 12 and one insulation intermediate part 13 are formed to extend from an intermediate portion of the insulation body part 11 in the longitudinal direction toward an outer side in the lateral direction of the insulation body part 11. In addition, another insulation terminal part 12 and another insulation intermediate part 13 are formed to extend outward from the vicinity of a longitudinal terminal in the longitudinal direction on a longitudinal side edge of the insulation body part 11. However, the arrangement of the insulation terminal parts 12 and the insulation intermediate parts 13 can be set arbitrarily.

The first electrode sheets 20 are arranged on a first surface of the insulator sheet 10, that is, on the front surface (front side in FIG. 1) of the insulator sheet 10, in the surface direction of the insulator sheet 10. The first electrode sheets 20 form extraction electrodes. The first electrode sheets 20 are conductive. In addition, the first electrode sheets 20 are soft. That is, the first electrode sheets 20 are flexible and configured to be stretchable in the surface direction. The first electrode sheets 20 are formed by, for example, a conductive cloth, a conductive elastomer, a metal foil, etc.

Each of the first electrode sheets 20 includes a first electrode body part 21, a first electrode terminal part 22, and a first electrode intermediate part 23. The first electrode body part 21 is formed in a planar shape. Each of the first electrode body parts 21 is disposed to be overlapped with the insulation body part 11 of the insulator sheet 10. The first electrode terminal part 22 is indirectly connected with the first electrode body part 21, formed toward an outer side in the surface direction from a side edge of the first electrode body 21, and is disposed to be overlapped with the insulation terminal part 12 of the insulator sheet 10.

The first electrode intermediate part 23 connects the first electrode body part 21 and the first electrode terminal part 22. That is, in the surface direction of the first electrode sheet 20, the first electrode intermediate part 23 is interposed between the first electrode body part 21 and the first electrode terminal part 22. The first electrode intermediate part 23 is disposed to be overlapped with the insulation intermediate part 13. The first electrode terminal part 22 may also be directly connected with the first electrode body part 21. In this case, the first electrode intermediate part 23 is omitted.

One second electrode sheet 30 is disposed on the side of a second surface of the insulator sheet 10, that is, on the back surface (the deep side surface of FIG. 1) of the insulator sheet 10. One second electrode sheet 30 forms one shield electrode facing the first electrode sheets 20. The second electrode sheet 30 is conductive. In addition, the second electrode sheet 30 is soft. That is, the second electrode sheet 30 is flexible and configured to be stretchable in the surface direction. The second electrode sheet 30 is formed by, for example, a conductive cloth, a conductive elastomer, a metal foil, etc.

The second electrode sheet 30 includes one second electrode body part 31, multiple second electrode terminal parts 32, and multiple second electrode intermediate parts 33. The second electrode body part 31 is formed in a planar shape. The second electrode body part 31 is disposed to be overlapped with the insulation body part 11 of the insulator sheet 10. In addition, one second electrode body part 31 is disposed to face the entire surfaces of the first electrode body parts 21.

The number of the second electrode terminal parts 32 is the same as the number of the first electrode terminal parts 22. Each of the second electrode terminal parts 32 is indirectly connected with the second electrode body part 31, formed toward an outer side in the surface direction from a side edge of the second electrode body part 31, and is disposed to be overlapped with the insulation terminal part 12 of the insulator sheet 10. The respective second electrode terminal parts 32 are disposed at positions spaced apart from the respective first electrode terminal parts 22 in the surface directions of the insulation terminal parts 12 of the insulator sheet 10. That is, when viewed in the normal directions of the insulation terminal parts 12, the first electrode terminal parts 22 and the second electrode terminal parts 32 are located at different positions. This is to reduce the thickness of the electrostatic sheet 2 resulting from the presence of the first lead wires 40 and the second lead wires 50 to be described afterwards.

Each of the second electrode intermediate parts 33 connects the second electrode body part 31 and the second electrode terminal part 32. That is, in the surface direction of the second electrode sheet 30, the second electrode intermediate part 33 is interposed between the second electrode body part 31 and the second electrode terminal part 32. The second electrode intermediate part 33 is disposed to be overlapped with the insulation intermediate part 13. At least a portion of the second electrode intermediate part 33 is disposed to face the first electrode intermediate part 23. It may also be disposed that the entire second electrode intermediate part 33 faces the first electrode intermediate part 23. In addition, the second electrode terminal part 32 may also be directly connected with the second electrode body part 31. In this case, the second electrode intermediate part 33 is omitted.

Each of the first lead wires 40 has a portion disposed to be overlapped with the first surface of the insulator sheet 10 and a portion disposed to be overlapped with the first electrode sheet 20. Specifically, the respective first lead wires 40 are disposed to be overlapped with the respective insulation terminal parts 12 of the insulator sheet 10. The first lead wire 40 is electrically joined with the first electrode terminal part 22 of the first electrode sheet 20, and is electrically joined with the first electrode body part 21 via the first electrode intermediate part 23. Moreover, the first lead wires 40 are respectively joined to the insulation terminal parts 12 of the insulator sheet 10.

Each of the second lead wires 50 has a portion disposed to be overlapped with the second surface of the insulator sheet 10 and a portion disposed to be overlapped with the second electrode sheet 30. Specifically, the respective second lead wires 50 are disposed to be overlapped with the respective insulation terminal parts 12 of the insulator sheet 10. The second lead wire 50 is electrically connected with the second electrode terminal part 32 of the second electrode sheet 30, and is electrically connected with the second electrode body part 31 via the second electrode intermediate part 33. Moreover, the second lead wires 50 are respectively joined to the insulation terminal parts 12 of the insulator sheet 10.

3. Detailed Configuration of the Terminal Portions of the Electrostatic Sheet 2

Figure 2:
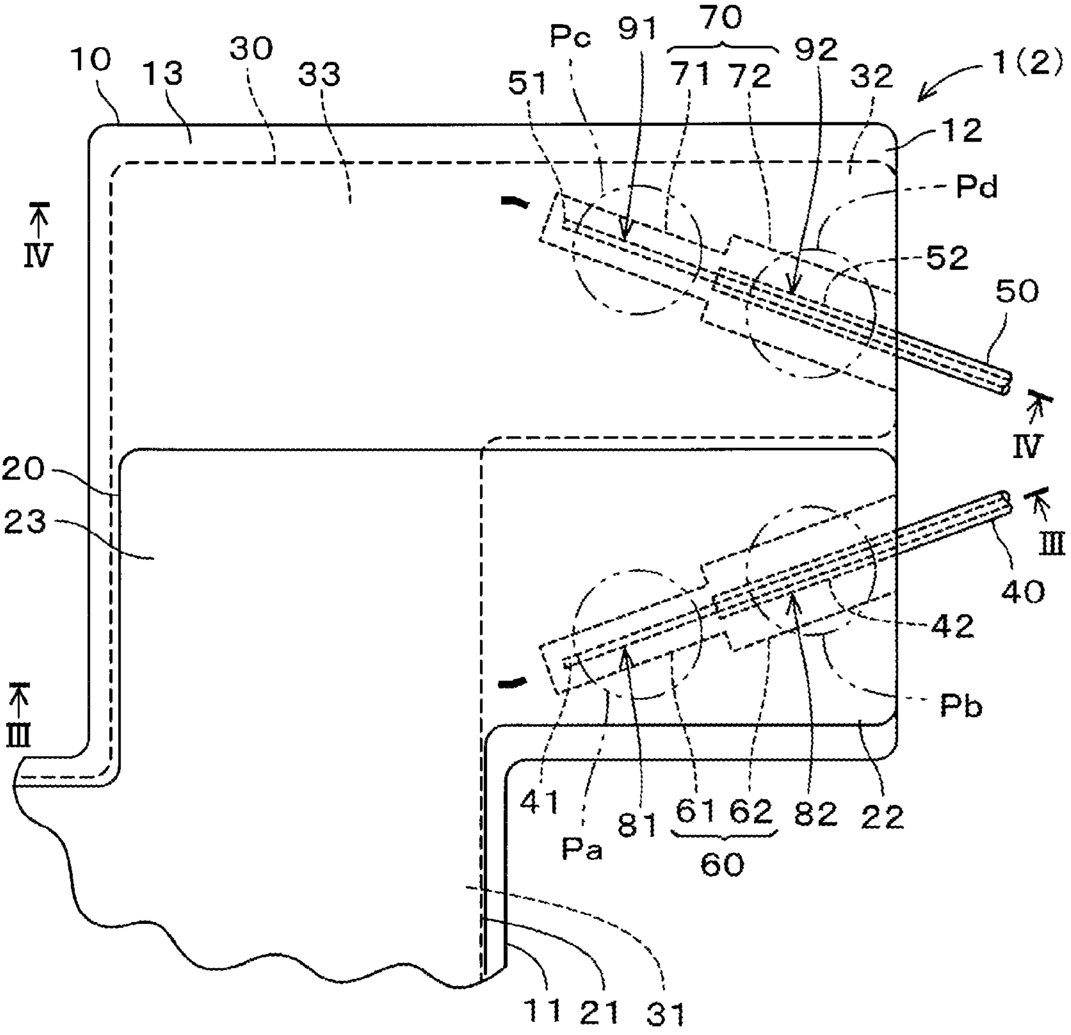
FIG. 2 is an enlarged view of a portion II of FIG. 1.

The detailed configuration of the terminal portion of the electrostatic sheet 2 forming the electrostatic transducer 1 is described with reference to FIGS. 2 to 4. FIG. 2 illustrates the terminal portion at the upper right of FIG. 1, and the detailed configuration of the terminal portion is described in the following. It is noted that the terminal portion at the lower center of FIG. 1 has substantially the same configuration.

As described with reference to FIG. 1, the electrostatic sheet 2 at least includes the insulator sheet 10, the first electrode sheets 20, and the second electrode sheet 30. As described above, the insulator sheet 10 is formed by including a thermoplastic material, exhibits a flexible property, and is configured to be stretchable in the surface direction.

The first electrode sheet 20 is disposed on the side of the first surface of the insulator sheet 10, that is, the front surface (the upper surface in FIGS. 3 and 4) of the insulator sheet 10. The first electrode sheet 20 is conductive and flexible, and is configured to be stretchable in the surface direction. In FIGS. 3 and 4, the case where the first electrode sheet 20 is a conductive cloth is described. Nevertheless, the first electrode sheet 20 may also be formed by a conductive elastomer, a metal coil, etc.

The case where the first electrode sheet 20 is formed by a conductive cloth is described in detail. The conductive cloth is a woven or non-woven fabric made of conductive fibers. Here, the conductive fibers are formed by covering the surfaces of soft fibers with a conductive material. The conductive fibers are formed, for example, by plating the surface of resin fibers, such as polyethylene, with copper, nickel, etc.

In such case, the first electrode sheet 20 is joined to the insulator sheet 10 through fusion (thermal fusion) of the insulator sheet 10 itself. In addition, since the first electrode sheet 20 is a cloth, the first electrode sheet 20 has multiple through holes. Accordingly, a portion of the insulator sheet 10 enters the through hole of the first electrode sheet 20. That is, at least a portion of the first electrode sheet 20 is embedded in the insulator sheet 10.

The case where the first electrode sheet 20 is formed by a conductive elastomer is described in detail. In such case, the first electrode sheet 20 is formed by using an elastomer as a base material and including a conductive filler. The elastomer, which is the base material of the first electrode sheet 20, may have the same main component as the insulator sheet 10. In particular, the first electrode sheet 20 may also be formed by using a thermoplastic elastomer as the base material.

However, the first electrode sheet 20 may also be formed by a material having a softening point higher than the softening point of the insulator sheet 10. This is to soften the insulator sheet 10 before the first electrode sheet 20 at the time of joining the first electrode sheet 20 to the insulator sheet 10 through the fusion (thermal fusion) of the insulator sheet 10 itself. As a result, the thickness of the insulator sheet 10 can be a desired thickness.

Here, the first electrode sheet 20 is joined to the insulator sheet 10 through fusion (thermal fusion) of the insulator sheet 10 itself. In addition, in the case where the first electrode sheet 20 is formed to locate the thermoplastic elastomer on the front surface, the first electrode sheet 20 and the insulator sheet 10 are joined through fusion (thermal fusion) of the first electrode sheet 20 itself. That is, the first electrode sheet 20 and the insulator sheet 10 are joined by being fused to each other. It is noted that the first electrode sheet 20 and the insulator sheet 10 may also be joined by fusing only one of the first electrode sheet 20 and the insulator sheet 10.

The case where the first electrode sheet 20 is formed by a metal coil is described in detail. Like the conductive cloth, the metal coil may have may have multiple through holes. Accordingly, the first electrode sheet 20 is flexible and able to stretch in the surface direction together with the deformation of the through holes. The metal coil is sufficient as long as it is formed by a conductive metal material. For example, a copper foil, an aluminum foil, etc., can be applied as the metal material. In addition, like the case where the first electrode sheet 20 is a conductive cloth, the first electrode sheet 20 is jointed to the insulator sheet 10 through the fusion (thermal fusion) of the insulator sheet 10 itself.

The second electrode sheet 30 is disposed on the side of the second surface of the insulator sheet 10, that is, the back surface (the lower surface in FIGS. 3 and 4) of the insulator sheet 10. It is assumed that, in the case where the elastic transducer 1 includes a base material (not shown), the second electrode sheet 30 is disposed between the insulator sheet 10 and the base material. The second electrode sheet 30 is formed like the first electrode sheet 20. That is, the second electrode sheet 30 is soft and formed by a conductive cloth, a conductive elastomer, a metal foil, etc.

The electrostatic sheet 2 further includes the first lead wires 40, the second lead wires 50, first joint limitation layers 60, and second joint limitation layers 70.

Figure 3:
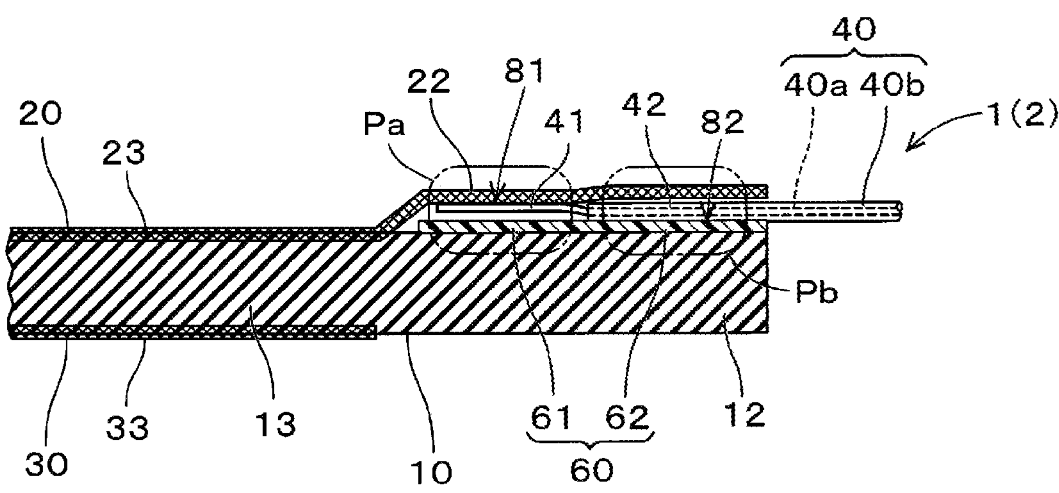
FIG. 3 is a cross-sectional view taken along III-III of FIG. 2.

As shown in FIGS. 2 and 3, the first joint limitation layer 60 is disposed between the insulation terminal part 12 of the insulator sheet 10 and the first electrode terminal part 22 of the first electrode sheet 20, and limits the joining between the insulator sheet 10 and the first electrode sheet 20. Accordingly, within the first electrode terminal part 22 of the first electrode sheet 20, in a region where the first bonding limitation layer 60 is present, a space with the first bonding limitation layer 60 is formed. Meanwhile, within the first electrode terminal part 22 of the first electrode sheet 20, in a region where the first bonding limitation layer 60 is not present, the first electrode terminal part 22 is joined to the insulator sheet 10.

Moreover, through fusion of the insulator sheet 10 itself, the first joint limitation layer 60 is joined to the insulator sheet 10. Here, the first joint limitation layer 60, for example, is formed by a material having a softening point higher than the softening point of the insulator sheet 10. For example, a resin sheet formed by using a thermoplastic material can be used as the first joint limitation layer 60.

As shown in FIG. 2, the first joint limitation layer 60 is formed in an elongated shape. A longitudinal end of the first joint limitation layer 60 is disposed on an end edge of the first electrode terminal part 22 of the first electrode sheet 20. The other longitudinal end of the first joint limitation layer 60 is disposed to extend from the end edge of the first electrode terminal part 22 of the first electrode sheet 20 toward the first electrode intermediate part 23 of the first electrode sheet 20. In the embodiment, the other longitudinal end of the first joint limitation layer 60 is disposed to extend in a direction intersecting with the end edge of the first electrode sheet 20, more specifically, in an oblique direction.

The first joint limitation layer 60 includes a deep part 61 formed with a small width and an edge part 62 having a large width. In FIG. 2, the deep part 61 is formed with the same width throughout the entire length, and the edge part 62 is also formed with the same width throughout the entire length. In addition, it may also be that the width gradually decreases from the base end of the edge part 62 (the end edge of the first electrode terminal part 22 of the first electrode sheet 20) toward the tip end of the deep part 61. In addition, the first joint limitation layer 60 may be formed in a plate shape, or a recess part or a convex part may also be formed on one or both of the surfaces of the first joint limitation layer 60.

As shown in FIG. 3, the first lead wire 40 includes a first core wire **40*a* and a first cover material 40*b* insulating and covering the outer peripheral surface of the first core wire 40*a*. The first core wire 40*a* is formed by a copper wire, for example. The first cover material 40*b* is formed by including a thermoplastic material. The first cover material 40*b* may be an insulating thermoplastic material. For example, the first cover material 40*b* may be formed by a material suitable for the insulator sheet 10**.

A portion of the first lead wire 40 is disposed on the insulation terminal part 12 within the first surface (the upper surface of FIG. 3) of the insulator sheet 10. In the electrostatic sheet 2, since a portion of the first lead wire 40 is disposed in region where the insulation terminal part 12 of the insulator sheet 10 and the first electrode terminal part 22 of the first electrode sheet 20 are both present, the portion of the first lead wire 40 is disposed to be overlapped with the insulation terminal part 12 and disposed to be overlapped with the first electrode terminal part 22 as well.

In the case where there is a region in which the first electrode terminal part 22 of the first electrode sheet 20 is not disposed to be overlapped with a portion of the insulation terminal part 12 of the insulator sheet 10, the first lead wire 40 may also be respectively provided with a portion disposed to be overlapped with the insulation terminal part 12 only and a portion overlapped with the insulation terminal part 12 and the first electrode terminal part 22. In such case, the first lead wire 40 at least has a portion disposed to be overlapped with the insulation terminal part 12 and a portion disposed to be overlapped with first electrode terminal part 22.

In the embodiment, the first lead wire 40 is disposed between the insulation terminal part 12 and the first electrode terminal part 22. In particular, since the first joint limitation layer 60 is disposed at the insulation terminal part 12, the first lead wire 40 is disposed between the first joint limitation layer 60 and the first electrode terminal part 22.

On the tip end side of the first lead wire 40, the first lead wire 40 is provided with a first core wire exposing part 41 in which the first cover material **40*b* is removed and the first core wire 40*a* is exposed. In addition, on the base end side with respect to the first core wire exposing part 41, the first lead wire 40 includes a first core wire covered part 42 in which the first cover material 40*b*** is not removed.

The first core wire exposing part 41 may be configured as described in the following. In the first core wire exposing part 41, a metal plating layer is formed on the first core wire 40*a* formed by a copper wire. In such case, the metal plating layer is suitably a nickel plating layer. In addition, the first core wire exposing part 41 may also be a solder flow layer formed in the first core wire 40*a*. The metal plating layer and the solder flow layer serve to render favorable conduction with the first electrode terminal part 22.

The first core wire exposing part 41 of the first lead wire 40 is disposed at the deep part 61 of the first joint limitation layer 60, and the first core wire cover part 42 is disposed at the edge part 62 of the first joint limitation layer 60. In addition, the first lead wire 40 extends outward from the edge part 62 of the first joint limitation layer 60.

By being inserted into the space formed between the first joint limitation layer 60 and the first electrode terminal part 22, the first lead wire 40 is disposed at such position. In the first joint limitation layer 60, the edge part 62 is wide, and the deep part 61 is narrow. Accordingly, at the time when the first lead wire 40 is inserted, the initial insertion is easy because of the wide width of the edge part 62, and the first lead wire 40 can be positioned at the desired position due to the narrow width of the deep part 61.

In addition, the electrostatic sheet 2 includes a first electrical joint part 81. The first electrical joint part 81 electrically joins the first electrode terminal part 22 and the first core wire exposing part 41 of the first lead wire 40 in a first electrical joint region Pa where the first electrode terminal part 22 and the first core wire exposing part 41 of the first lead wire 40 are adjacent and disposed to be overlapped with each other among a region in the surface direction of the insulation terminal part 12. That is, the first electrical joint part 81 is disposed in a lamination region of the insulation terminal part 12 and the first electrode terminal part 22.

In the embodiment, in the first electrical joint region Pa, the first electrode terminal part 22 and a portion of the first core wire 40*a* in the first core wire exposing part 41 are electrically jointed via a metal plating layer or a solder flow layer. That is, the first electrical joint part 81 is formed by a portion of the metal plating layer or a portion of the solder flow layer. In particular, with the first electrical joint part 81 being formed by a portion of the solder flow layer, the first electrode terminal part 22 and the portion of the first core wire 40*a* in the first core wire exposing part 41 are electrically jointed on the surface, and can achieve favorable conduction.

Here, a portion of the first joint limitation layer 60 is disposed in the first electrical joint region Pa. Accordingly, after the first lead wire 40 is inserted between the first electrode terminal part 22 and the first joint limitation layer 60, the first electrode terminal part 22 is electrically joined with the first core wire exposing part 41 of the first lead wire 40 by performing an ultrasonic welding process on the first electrical joint region Pa. Since the first electrode terminal part 22 and the first lead wire 40 have metal on the surface, the first electrode terminal part 22 and the first lead wire 40 are joined by ultrasonic welding. Meanwhile, although the first lead wire 40 and the first joint limitation layer 60 are adjacent, the first lead wire 40 and the first joint limitation layer 60 are not welded even if ultrasonic welding is applied, as they are metal and resin.

In addition, the electrostatic sheet 2 includes a first insulation joint part 82. The first insulation joint part 82 joins the insulation terminal part 12 and the first core wire cover part 42 of the first lead wire 40 in a first insulation joint region Pb where the insulation terminal part 12 and the first core wire cover part 42 of the first lead wire 40 are disposed to be overlapped with each other among the region in the surface direction of the insulation terminal part 12. The first insulation joint part 82 is disposed in the lamination region of the insulation terminal part 12 and the first electrode terminal part 22. However, the first insulation joint part 82 is disposed in a region different from the first electrical joint part 81 in the lamination region.

A portion of the first joint limitation part 60 is disposed in the first insulation joint region Pb. In addition, a portion of the first joint limitation layer 60 is disposed between the insulation terminal part 12 and the first core wire cover part 42 of the first lead wire 40 in the first insulation joint region Pb. Accordingly, in the first insulation joint region Pb, the insulation terminal part 12 and the first joint limitation layer 60 are joined, and the first joint limitation layer 60 and the first core wire cover part 42 of the first lead wire 40 are joined. That is, the first insulation joint part 82 is formed by a portion of the insulation terminal part 12, a portion of the first joint limitation layer 60, and a portion of the first core wire cover part 42. In this way, the first insulation joint part 82 indirectly joins the insulation terminal part 12 and the first core wire cover part 42 via the first joint limitation layer 60.

After the first lead wire 40 is inserted between the first electrode terminal part 22 and the first joint limitation layer 60, the insulation terminal part 12 and the first joint limitation layer 60 are joined and the first joint limitation layer 60 and the first core wire cover part 42 are joined by applying an ultrasonic welding process on the first insulation joint region Pb. The processing condition of the ultrasonic welding for the first insulation joint part 82 is different from the processing condition of the ultrasonic welding for the first electrical joint part 81. The first electrical joint part 81 sets a processing condition able to weld the first core wire exposing part 41, whereas the first insulation joint part 82 sets a processing condition that does not weld the first core 40*a* of the first core cover part 42.

Figure 4:
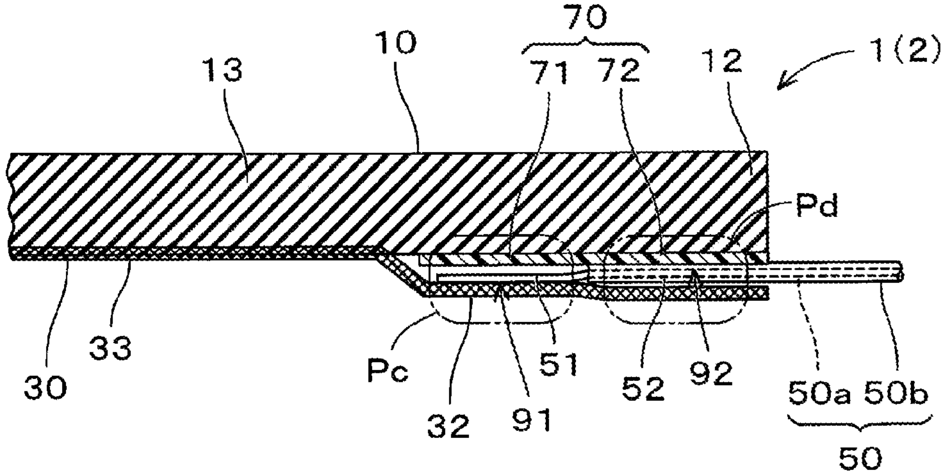
FIG. 4 is a cross-sectional view taken along IV-IV of FIG. 2.

As shown in FIGS. 2 and 4, the second joint limitation layer 70 is disposed between the insulation terminal part 12 of the insulator sheet 10 and the second electrode terminal part 32 of the second electrode sheet 30, and limits the joining between the insulator sheet 10 and the second electrode sheet 30. The second joint limitation layer 70 is formed to be substantially the same as the first joint limitation layer 60. Like the first joint limitation layer 60, the second joint limitation layer 70 includes a deep part 71 and an edge part 72.

As shown in FIG. 4, the second lead wire 50 includes a second core wire 50*a* and a second cover material 50*b* insulating and covering the outer peripheral surface of the second core wire 50*a*. On the tip end side of the second lead wire 50, the second lead wire 50 is provided with a second core wire exposing part 51 in which the second cover material 50*b* is removed and the second core wire 50*a* is exposed. In addition, the second lead wire 50 includes a second core wire cover part 52 where the second cover material 50*b* is not removed. The second lead wire 50 is formed to be substantially the same as the first lead wire 40.

In addition, the electrostatic sheet 2 includes a second electrical joint part 91 and a second insulation joint part 92. The second electrical joint part 91 electrically joins the second electrode terminal part 32 and the second core wire exposing part 51 of the second lead wire 50 in a second electrical joint region Pc. The second insulation joint part 92 indirectly joins the insulation terminal part 12 and the second core wire cover part 52 of the second lead wire 50 via the second joint limitation layer 70 in the second insulation joint region Pd. The second electrical joint part 91 and the second insulation joint part 92 are substantially the same as the first electrical joint part 81 and the first insulation joint part 82. In addition, the second electrical joint region Pc and the second insulation joint region Pd are substantially the same as the first electrical joint region Pa and the first insulation joint region Pb.

Accordingly, the second electrical joint part 91 and the second insulation joint part 92 are disposed in the lamination region of the insulation terminal part 12 and the second electrode terminal part 32. However, the second insulation joint part 92 is disposed in a region different from the second electrical joint part 91 in the lamination region.

Accordingly, the first electrode terminal part 22 and the second electrode terminal part 32 are disposed to be spaced apart in the surface direction of the insulation terminal part 12 of the insulator sheet 10. That is, the first electrical joint part 81 and the second electrical joint part 91 are disposed to be spaced apart in the surface direction of the insulation terminal part 12. In addition, the first insulation joint part 82 and the second insulation joint part 92 are disposed to be spaced apart in the surface direction of the insulation terminal part 12.

4. (Effects of Embodiment 1)

According to the electrostatic transducer 1 of Embodiment 1, the first electrical joint part 81 in the first electrical joint region Pa electrically joins the first electrode terminal part 22 and the first core wire 40*a* in the first core wire exposing part 41 of the first lead wire 40. Meanwhile, the first insulation joint part 82 in the first insulation joint region Pb joins the insulation terminal part 12 and the first cover material 40*b* in the first core wire cover part 42 of the first lead wire 40. That is, the first insulation joint part 82 in the first insulation joint region Pb mainly functions for the pull-out strength of the first lead wire 40.

In this way, electrical joining and pull-out strength can both be achieved by making the portion where the first electrode terminal part 22 and the first core wire 40*a* of the first lead wire 40 are electrically joined and the portion securing the pull-out strength of the first lead wire 40 separate portions. Accordingly, the first core wire 40*a* of the first lead wire 40 and the first electrode terminal part 22 can be reliably joined electrically, and the pull-out strength of the first lead wire 40 can be increased.

The same applies to the joining of the second electrode sheet 30 and the second lead wire 50. Accordingly, the second core wire 50*a* of the second lead wire 50 and the second electrode sheet 30 can be reliably jointed electrically, and the pull-out strength of the second lead wire 50 can be increased.

In addition, the first electrical joint part 81 and the second electrical joint part 91 are disposed to be spaced apart in the surface direction of the insulator sheet 10, and the first insulation joint part 82 and the second insulation joint part 92 are disposed to be spaced apart from one another in the surface direction of the insulator sheet 10. Accordingly, the joining process for the first electrical joint part 81 and the second electrical joint part 91 becomes easy, and the joining process for the first insulation joint part 82 and the second insulation joint part 92 becomes easy. Moreover, the thickness of the insulator sheet 10 can be reduced.

Accordingly, the first core wire 40*a* of the first lead wire 40 can be reliably electrically joined with the first electrode sheet 20, and the pull-out strength of the first lead wire 40 can be increased. In addition, the second core wire 50*a* of the second lead wire 50 can be reliably electrically joined with the second electrode sheet 30, and the pull-out strength of the second lead wire 50 can be increased.

Moreover, the insulator sheet 10 has the insulation body part 11 and the insulation terminal part 12. The insulation body part 11 is formed in a planar shape. The insulation terminal part 12 is directly or indirectly connected with the insulation body part 11 and formed toward an outer side in the surface direction from the side edge of the terminal body part 11. The first electrode sheet 20 has the first electrode body part 21 and the first electrode terminal part 22. The first electrode body part 21 is formed in a planar shape and disposed to be overlapped with the insulation body part 11. The first electrode terminal part 22 is directly or indirectly connected with the first electrode body part 21, and is formed toward an outer side from the side edge of the first electrode body part 21 21 and disposed to be overlapped with the insulation terminal part 12. The second electrode sheet 30 has the second electrode body part 31 and the second electrode terminal part 32. The second electrode body part 31 is formed in a planar shape and disposed to be overlapped with the insulation body part 11. The second electrode terminal part 32 is directly or indirectly connected with the second electrode body part 31, and is formed toward an outer side from the side edge of the second electrode body part 21 and disposed to be overlapped with the insulation terminal part 12.

The first electrical joint part 81 and the first insulation joint part 82 are disposed in the lamination region of the insulation terminal part 12 and the second electrode terminal part 22. The second electrical joint part 91 and the second insulation joint part 92 are disposed in the lamination region of the insulation terminal part 12 and the second electrode terminal part 32.

Accordingly, the first core wire 40*a* of the first lead wire 40 and the first electrode terminal part 22 can be reliably joined electrically, and the pull-out strength of the first lead wire 40 in the insulation terminal part 12 can be increased. Moreover, the second core wire 50*a* of the second lead wire 50 and the second electrode terminal part 32 can be reliably joined electrically, and the pull-out strength of the second lead wire 50 in the insulation terminal part 12 can be increased.

Moreover, the insulator sheet 10 has the insulation intermediate part 13 interposed between the insulation body part 11 and the insulation terminal part 12 in the surface direction of the insulator sheet 10. The first electrode sheet 20 has a first electrode intermediate part 23 interposed between the first electrode body part 21 and the first electrode terminal part 22 in the surface direction of the first electrode sheet 20 and disposed to be overlapped with the insulation intermediate part 13. The second electrode sheet 30 has a second electrode intermediate part 33 interposed between the second electrode body part 31 and the second electrode terminal part 32 in the surface direction of the second electrode sheet 30 and disposed to be overlapped with the insulation intermediate part 13.

By providing the insulation intermediate part 13, the first electrode intermediate part 23, and the second electrode intermediate part 33, the insulation body part 11, the first electrode body part 21, as well as the second electrode body part 31 as portions functioning as a sensor or an actuator and the insulation terminal part 12, the first electrode terminal part 22, and the second electrode terminal part 32 joined with the first lead wire 40, and the second lead wire 50 can be provided at separate positions. Accordingly, the respectively functions can be exerted reliably.

In addition, the electrostatic transducer 1 includes the first joint limitation layer 60 disposed, in the first electrical joint region Pa, between the insulator sheet 10 and the first electrode sheet 20 and limits the joining between the insulator sheet 10 and the first electrode sheet 20. By providing the first joint limitation layer 60, a bag-like portion between the insulation terminal part 12 of the insulator sheet 10 and the first electrode terminal part 22 of the first electrode sheet 20 can be formed easily. In addition, in the state in which the first lead wire 40 is inserted into the bag-like portion formed by the insulation terminal part 12 and the first electrode terminal part 22, the first lead wire 40 is joined to the insulation terminal part 12 and the first electrode terminal part 22. Accordingly, it is easy to position the first lead wire 40 at a desired position, and the first lead wire 40 can be positioned reliably.

The electrostatic transducer 1 includes the second joint limitation layer 70 disposed, in the second electrical joint region Pc, between the insulator sheet 10 and the second electrode sheet 30 and limits the joining between the insulator sheet 10 and the second electrode sheet 30. By providing the second joint limitation layer 70, a bag-like portion between the insulation terminal part 12 of the insulator sheet 10 and the second electrode terminal part 32 of the second electrode sheet 30 can be formed easily. In addition, in the state in which the second lead wire 50 is inserted into the bag-like portion formed by the insulation terminal part 12 and the second electrode terminal part 32, the second lead wire 50 is joined to the insulation terminal part 12 and the second electrode terminal part 32. Accordingly, it is easy to position the second lead wire 50 at a desired position, and the second lead wire 50 can be positioned reliably.

In addition, a portion of the first joint limitation layer 60 is disposed between the insulator sheet 10 and the first cover material **40*b* of the first lead wire 40 in the first insulation joint region Pb. The first insulation joint part 82 is formed by a portion of the first joint limitation layer 60, a portion of the insulator sheet 10, and a portion of the first cover material 40*b* of the first lead wire 40. In the configuration having the first joint limitation layer 60, the first insulation joint part 82** can be reliably formed.

A portion of the second joint limitation layer 70 is disposed between the insulator sheet 10 and the second cover material **50*b* of the second lead wire 50 in the second insulation joint region Pd. The second insulation joint part 92 is formed by a portion of the second joint limitation layer 70, a portion of the insulator sheet 10, and a portion of the second cover material 50*b* of the second lead wire 50. In the configuration having the second joint limitation layer 70, the second insulation joint part 92** can be reliably formed.

The first joint limitation layer 60 and the second joint limitation layer 70 are formed by a material having a softening point higher than the softening point of the insulator sheet 10. Accordingly, through fusion of the insulator sheet 10 itself, the first joint limitation layer 60 is joined to the insulator sheet 10. Similarly, through fusion of the insulator sheet 10 itself, the second joint limitation layer 70 is joined to the insulator sheet 10.

In addition, the first joint limitation layer 60 and the second joint limitation layer 70 are resin sheets formed by including a thermoplastic material. Accordingly, the first joint limitation layer 60 and the second joint limitation layer 70 can be joined to the first insulator sheet 10.

The first joint limitation layer 60 is formed in an elongated shape, and a longitudinal end of the first joint limitation layer 60 is disposed on an end edge of the first electrode sheet 20. Accordingly, a bag-like portion is formed between the insulation terminal part 12 of the insulator sheet 10 and the first electrode terminal part 22 of the first electrode sheet 20, and an entrance of the bag-like portion can be formed.

In addition, the second joint limitation layer 70 is formed in an elongated shape, and a longitudinal end of the second joint limitation layer 70 is disposed on an end edge of the second electrode sheet 30. Accordingly, a bag-like portion is formed between the insulation terminal part 12 of the insulator sheet 10 and the second electrode terminal part 32 of the second electrode sheet 20, and an entrance of the bag-like portion can be formed.

In addition, multiple first electrode sheets 20 are arranged in the surface direction of the insulator sheet 10, and the second electrode sheet 30 is configured as one shield electrode facing the first electrode sheets 20. The function as a sensor or an actuator can be exerted at the position of each of the first electrode sheets 20. Meanwhile, even if the second electrode sheet 30 form one shield electrode, a shield function with respect to the respective functions of the first electrode sheets 20 can be exerted reliably. Accordingly, by making the second electrode sheet 30 one shield electrode, the manufacturing cost can be reduced.

In addition, multiple first electrode sheets 20 are arranged in the surface direction of the insulator sheet 10, and the second electrode sheet 30 is configured as one shield electrode facing the first electrode sheets 20. In addition, the insulator sheet 10 has multiple insulation terminal parts 12, and each of the first electrode sheets 20 has the first electrode terminal part 22. One second electrode sheet 30 has second electrode terminal parts 32 in the same number as the first electrode sheets 20. For each of the insulation terminal parts 12, the first electrode terminal part 22 is disposed to be overlapped with the insulation terminal part 12 and the second electrode terminal part 32 is disposed to be overlapped with the insulation terminal part 12. Even if the second electrode sheet 30 is configured as one shield electrode, the second electrode terminal parts 32 are provided in the same number of the first electrode sheets 20. Accordingly, the second lead wire 50 connected with the second electrode sheet 30 can be disposed at a position close to the first electrode body part 21. As a result, the stability of the shield function is increased.

In addition, by using different ultrasonic welding processing conditions in the first electrical joint region Pa and the first insulation joint region Pb, electrical joining can be performed in the first electrical joint portion Pa, and joining that secures the pull-out strength can be performed in the first insulation joint region Pb. Likewise, by using different ultrasonic welding processing conditions in the second electrical joint region Pc and the second insulation joint region Pd, electrical joining can be performed in the second electrical joint portion Pc, and joining that secures the pull-out strength can be performed in the second insulation joint region Pd.

Embodiment 2

Figure 5:
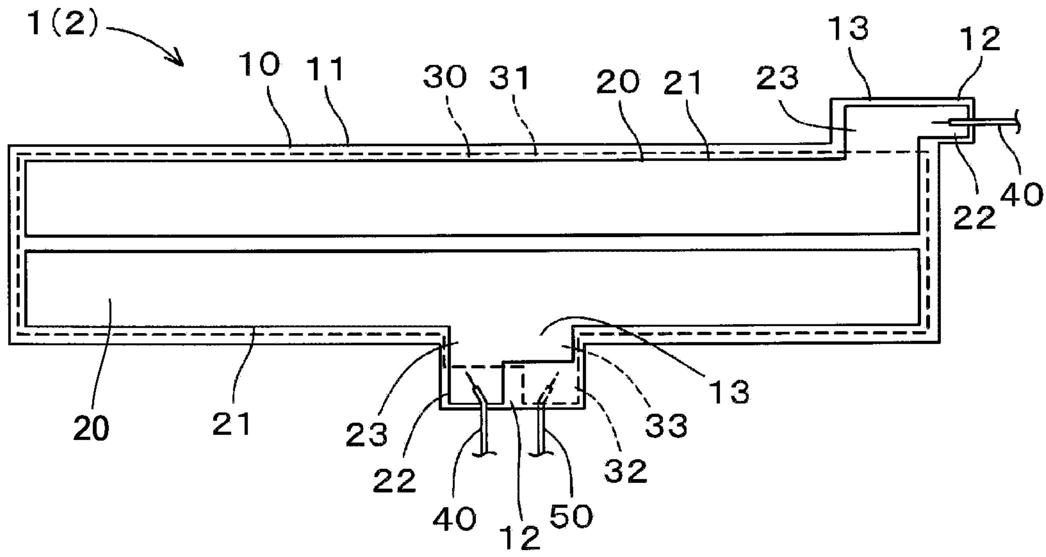
FIG. 5 is a plan view illustrating an electrostatic transducer according to Embodiment 2.

The configuration of the electrostatic transducer 1 of Embodiment 2 is described with reference to FIG. 5. In the electrostatic sheet 2 forming the electrostatic transducer 1, the insulator sheet 10 has multiple insulation terminal parts 12. Each of the first electrode sheets 20 has the first electrode terminal part 22. One second electrode sheet 30 has one second electrode terminal part 32.

In addition, the first electrode terminal part 22 is disposed to be overlapped with one of the insulation terminal parts 12, and the second electrode terminal part 32 is disposed to be overlapped with the one insulation terminal part 12. Meanwhile, the first electrode terminal part 22 is disposed to be overlapped with the remaining insulation terminal part 12, and the second electrode terminal part 32 is not disposed to be overlapped with the remaining insulation terminal part 12. Accordingly, the number of the second lead wires 50, the cost, and the size can be reduced.

What is claimed is:

1. An electrostatic transducer, comprising:

an insulator sheet;

a first electrode sheet, disposed on a first surface of the insulator sheet;

a second electrode sheet, disposed on a second surface of the insulator sheet;

a first lead wire, comprising: a first core wire; and a first cover material, covering the first core wire and containing a thermoplastic material, wherein the first lead wire has a portion disposed to be overlapped with the first surface of the insulator sheet and a portion disposed to be overlapped with the first electrode sheet;

a second lead wire, comprising: a second core wire; and a second cover material, covering the second core wire and containing a thermoplastic material, wherein the second lead wire has a portion disposed to be overlapped with the second surface of the insulator sheet and a portion disposed to be overlapped with the second electrode sheet;

a first electrical joint part, electrically joining the first electrode sheet and the first core wire of the first lead wire in a first electrical joint region which is a region in a surface direction of the insulator sheet and in which the first electrode sheet and the first core wire of the first lead wire are disposed to be overlapped;

a first insulation joint part, joining the insulator sheet and the first cover material of the first lead wire in a first insulation joint region which is a region different from the first electrical joint region in the surface direction of the insulator sheet and in which the insulator sheet and the first cover material of the first lead wire are disposed to be overlapped;

a second electrical joint part, electrically joining the second electrode sheet and the second core wire of the second lead wire in a second electrical joint region which is a region in the surface direction of the insulator sheet and in which the second electrode sheet and the second core wire of the second lead wire are disposed to be overlapped; and a second insulation joint part, joining the insulator sheet and the second cover material of the second lead wire in a second insulation joint region which is a region different from the second electrical joint region in the surface direction of the insulator sheet and in which the insulator sheet and the second cover material of the second lead wire are disposed to be overlapped, wherein the first electrical joint part and the second electrical joint part are disposed to be spaced apart in the surface direction of the insulator sheet, and the first insulation joint part and the second insulation joint part are disposed to be spaced apart in the surface direction of the insulator sheet, the portion of the first lead wire that is disposed to be overlapped with the first electrode sheet is disposed between the first electrode sheet and the insulator sheet, the portion of the second lead wire that is disposed to be overlapped with the second electrode sheet is disposed between the second electrode sheet and the insulator sheet, the first electrical joint region and the first insulation joint region are overlapped with the first electrode sheet but are not overlapped with the second electrode sheet, and the second electrical joint region and the second insulation joint region are overlapped with the second electrode sheet but are not overlapped with the first electrode sheet.

2. The electrostatic transducer as claimed in claim 1, wherein the insulator sheet comprises:

an insulation body part, formed in a planar shape; and an insulation terminal part, directly or indirectly connected with the insulation body part and formed toward an outer side in a surface direction from a side edge of the insulation body part, the first electrode sheet comprises:

a first electrode body part, formed in a planar shape and disposed to be overlapped with the insulation body part; and a first electrode terminal part, directly or indirectly connected with the first electrode body part, formed toward an outer side in the surface direction from a side edge of the first electrode body part, and disposed to be overlapped with the insulation terminal part, the second electrode sheet comprises:

a second electrode body part, formed in a planar shape and disposed to be overlapped with the insulation body part; and a second electrode terminal part, directly or indirectly connected with the second electrode body part, formed toward an outer side in the surface direction from a side edge of the second electrode body part, and disposed to be overlapped with the insulation terminal part, the first electrical joint part and the first insulation joint part are disposed in a lamination region of the insulation terminal part and the first electrode terminal part, and the second electrical joint part and the second insulation joint part are disposed in a lamination region of the insulation terminal part and the second electrode terminal part.

3. The electrostatic transducer as claimed in claim 2, wherein the insulator sheet is further provided with an insulation intermediate part interposed between the insulation body part and the insulation terminal part in the surface direction of the insulator sheet, the first electrode sheet is further provided with a first electrode intermediate part interposed between the first electrode body part and the first electrode terminal part in a surface direction of the first electrode sheet and disposed to be overlapped with the insulation intermediate part, and the second electrode sheet is further provided with a second electrode intermediate part interposed between the second electrode body part and the second electrode terminal part in a surface direction of the second electrode sheet and disposed to be overlapped with the insulation intermediate part.

4. The electrostatic transducer as claimed in claim 1, further comprising:

a first joint limitation layer, disposed between the insulator sheet and the first electrode sheet in the first electrical joint region and limiting joining of the insulator sheet and the first electrode sheet; and a second joint limitation layer, disposed between the insulator sheet and the second electrode sheet in the second electrical joint region and limiting joining of the insulator sheet and the second electrode sheet.

5. The electrostatic transducer as claimed in claim 4, wherein a portion of the first joint limitation layer is disposed between the insulator sheet and the first cover material of the first lead wire in the first insulation joint region, the first insulation joint part is formed by a portion of the first joint limitation layer, a portion of the insulator sheet, and a portion of the first cover material of the first lead wire, a portion of the second joint limitation layer is disposed between the insulator sheet and the second cover material of the second lead wire in the second insulation joint region, and the second insulation joint part is formed by a portion of the second joint limitation layer, a portion of the insulator sheet, and a portion of the second cover material of the second lead wire.

6. The electrostatic transducer as claimed in claim 4, wherein the first joint limitation layer and the second joint limitation layer are formed by a material having a softening point higher than a softening point of the insulator sheet.

7. The electrostatic transducer as claimed in claim 6, wherein the first joint limitation layer and the second joint limitation layer are resin sheets formed by containing a thermoplastic material.

8. The electrostatic transducer as claimed in claim 4, wherein the first joint limitation layer is formed in an elongated shape, and a longitudinal end of the first joint limitation layer is disposed on an end edge of the first electrode sheet, and the second joint limitation layer is formed in an elongated shape, and a longitudinal end of the second joint limitation layer is disposed on an end edge of the second electrode sheet.

9. The electrostatic transducer as claimed in claim 1, wherein a plurality of first electrode sheets are arranged in the surface direction of the insulator sheet, and the second electrode sheet forms one shield electrode facing the first electrode sheets.

* * * * *